Sept. 15, 1936. D. L. COVYEOW Re. 20,108
CHARGE TREATING DEVICE FOR INTERNAL COMBUSTION ENGINES
Original Filed Oct. 21, 1933
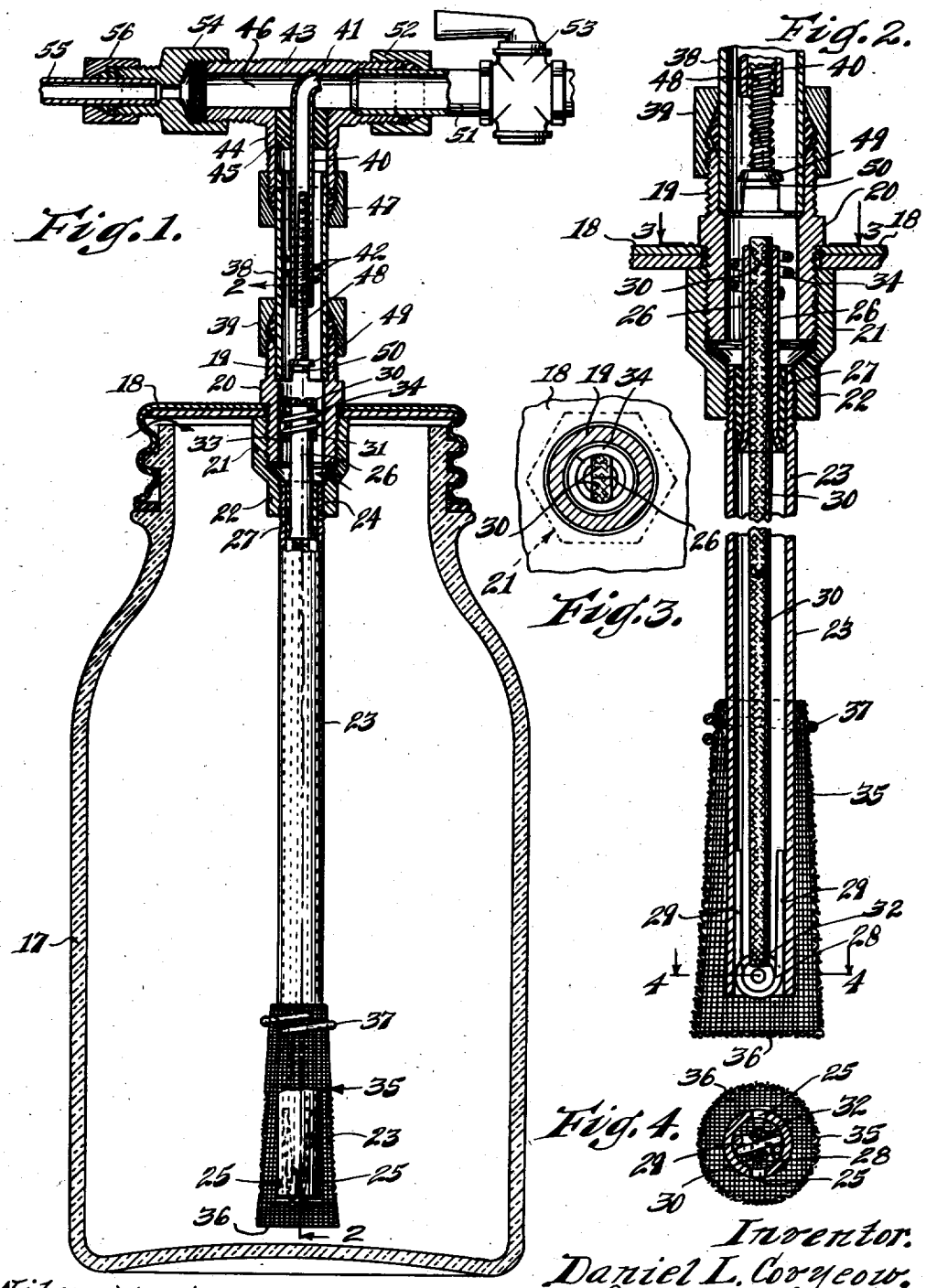
Witnesses:
E. E. Wessels
Anita E. Mature
Inventor.
Daniel L. Covyeow,
By Joshua R. H. Pope
his Attorney.

Reissued Sept. 15, 1936

Re. 20,108

UNITED STATES PATENT OFFICE 20,108

CHARGE TREATING DEVICE FOR INTERNAL COMBUSTION ENGINES

Daniel L. Covyeow, Chicago, Ill.

Original No. 1,983,268, dated December 4, 1934, Serial No. 694,629, October 21, 1933. Application for reissue October 14, 1935, Serial No. 45,006

9 Claims. (Cl. 261—99)

This invention relates to internal combustion engines, and more particularly to the treatment of the fuel charge, the principal object being to prevent the accumulation of carbon deposits within the combustion chambers and cylinders of the engine and accomplish an increase in the power and efficiency of the engine.

The present application involves an invention and improvement over the subject matter of Letters Patent No. 1,918,898, issued to me on July 18, 1933.

An object has been to provide novel and improved means for the positioning of the wick elements and permanent retention of the same in proper position.

An object also has been to provide novel and improved means for preventing contact of more or less solid matter with the wick elements, and to enhance in general the effective operation of the means for preventing the accumulation of carbon deposits within the combustion chambers and cylinders, and of internal combustion engines.

The invention also has for an object the provision of means of the character described which will be simple of construction, easy of manufacture, and relatively inexpensive, besides being simple of assembly.

Other of the objects and advantages attained will hereinafter more fully appear.

The invention will be best understood by reference to the accompanying drawing, forming a part of this specification, and in which:

Fig. 1 is a vertical sectional view of a preferred form of the device of my invention;

Fig. 2 is an enlarged sectional view, taken on the line 2—2 of Fig. 1;

Fig. 3 is a plan sectional view, taken on the line 3—3 of Fig. 2; and

Fig. 4 is a plan sectional view, taken on the line 4—4 of Fig. 2.

The concrete exemplification which I have selected to illustrate the principle of my invention may be utilized as shown in the Letters Patent hereinbefore referred to, to which reference is made, to wit, with an intake manifold and exhaust manifold which may be located on the same side of the engine block, and a carburetor connected to a source of hydrocarbon fuel supply and provided with the usual throttle valve arm and operating rod and other well known elements. The carburetor and the other cooperating adjuncts may be adjusted in the usual way for the proper operation of the engine, as though the device of the present invention were not applied.

In the practical adaptation and association of the invention as described in the accompanying drawing the apparatus includes a liquid supply receptacle 17 which may be a glass jar, provided with a screw cap 18. The liquid contents of the jar may be either plain water, or a mixture of water and alcohol, or other suitable liquid, which may be atomized and sprayed into the fuel mixture entering the combustion chamber of the engine. The screw cap 18 has a central opening in which is fitted a nipple member 19 having a shoulder 20. The nipple member 19 is secured in place relative to the screw cap 18 by virtue of a cap nut 21 which threads on nipple member 19 to cooperate with the shoulder 20 of the nipple member 19 to lock the nipple to the cap. The cap nut 21 has a reduced extension 22 at its lower end which is internally threaded for engagement with the upper end of a main wick tube 23, which is provided with threads 24. The tube 23 in the concrete exemplification shown has its upper end terminating with the upper end of the reduced extension 22. At the lower extremity of the tube 23 the same is provided with apertures 25 constituting ports for a purpose which will hereinafter be evident. A wick positioning tube 26 extends into and is secured by an annular body of solder 27 to the main wick tube 23, as is particularly shown in Fig. 2. The wick positioning tube 26 extends from approximately the plane of the screw cap 18 downwardly a short distance below the cap nut 21. At the bottom of the main wick tube 23 there is a wire spring 28 which is coiled or looped once and has arms 29. The spring 28 is located inside the lower portion of the tube and its arms extend upwardly a distance therefrom to clamp against the wall of the tube, as is particularly shown by Figs. 2 and 4.

A wick 30 has an end 31, shown particularly in Fig. 1, and the wick leads therefrom into the interior of the wick positioning tube 26 and downwardly therethrough and through the main wick tube 23 to the bottom thereof, and is passed through the member 32 of the wire spring 28, as particularly shown in Fig. 2, and is led back up through the main wick tube 23 and the wick positioning tube 26 over the top thereof and around again on the outside to form another end 33. The ends 31 and 33 are secured in position by means of a coil of wire 34 which winds around the outside of the wick position tube 26 and locks the ends between the wire and the tube, as particularly shown in Fig. 1. Adapted to be secured to the lower end of the main wick tube 23 is a gauze or mesh guard 35 which may be of frustoconical shape, having a gauze bottom 36, making the guard entirely closed when secured to the end of the main wick tube 23 by means of a coil of wire 37. The screen or guard 35 functions to prevent the entrance of solid matter into the tube 23, and at the same time permits the passage of the liquid therethrough into the tube, the shape of the guard being particularly effective for this purpose. If the bottom of the guard becomes clogged, the liquid may gain entrance into the interior of the tube and to the wick through the cylindrical wall, and also through the small apertures 25 hereinbefore referred to.

Mounted within the nipple member 19 is a supplemental nipple member 38 which is detachably secured thereto by a suitable coupling member 39. Extending downwardly through the supplemental nipple member 38 is a nozzle member 40, turned angularly as at 41, the nozzle member 40 being positioned centrally in the supplemental nipple member 38 by means of a coil of wire 42, as is particularly shown in Fig. 1. The nozzle member 40 extends into a T member 43 having a leg 44, by which it is secured to the nozzle 40 by means of a body of solder 45, the member 40 extending upwardly through the leg 44 and turned as shown in Fig. 1 into a central horizontal bore 46 in the T-shaped member 43. The T-shaped member 43 is secured by means of a coupling 47 to the supplemental nipple member 38.

Extending through the nozzle member 40, as particularly shown in Fig. 1, and freely slidable yet restricted, is the stem 48 of a gravity valve 49 which may be supported at rest on valve rest members 50, the valve rest members comprising inwardly turned portions of the lower end of the wall of the supplemental nipple member 38, forming in the concrete exemplification shown a pair of horizontal lugs or bearings, as particularly shown in Fig. 3.

The jar 17 may be suitably supported as set forth in the Letters Patent hereinbefore referred to.

The T member 43 is attached at one end to a pipe 51, by a coupling member 52, said pipe being tapped into the fuel intake manifold at some convenient point, preferably centrally of the manifold and between the carburetor and the places where the manifold communicates with the combustion chambers of the engine. The pipe 51 may be attached to the stem portion of the manifold, and a suitable pet cock or cutoff valve 53 may be provided in the pipe 51, between the nozzle member 40 and the place of connection with the fuel intake manifold. The pet cock or cutoff valve is normally open and only closed when it may be desired to dispense with the apparatus of the present invention and in making adjustments of the carburetor and other adjuncts for the particular fuel mixture desired for the operation of the engine, which is done regardless of the application and use of the present invention.

At the end of the T member 43, opposite to the end at which the pipe 51 is attached, is a reducing cap 54 which couples the T member 43 to a reducing pipe 55 by means also of a coupling 56, said pipe 55 being in turn attached to the delivery end portion of an air heating element (not shown).

Air is carried from the heating element in a highly heated condition to the nozzle member 40. The liquid in the jar may pass through the screen and be carried upwardly through the main wick tube 23 and the wick positioning tube 26 by the capillary action of the wick 30. It will be understood that the valve member has a plain disc-like head, and a central stem portion which fits loosely in the bore of the nozzle member 40, so that while there is free slidability, yet there is at the same time a restricted space between the stem 48 and the surrounding wall of the nozzle member 40. It should also be understood that the valve member 49 and the lower end portion of the nozzle member 40 are not formed with exact nicety for a perfectly fitted seating engagement, but rather they are somewhat roughly formed so that when the valve member 49 is seated against the end portion of the nozzle member 40 there is no complete stoppage of the passageway through the nozzle member, but only restricted checking of the flow is afforded. As will be understood by those skilled in the art, due to the vacuum in the pipe 51 created by the suction of the engine in operation, the liquid which is brought up into the nipple member 19 by capillary action of the wick 30 in the main tube 23 and the wick positioning tube 26, is taken off in small particles and drawn into the tube 51 and converted into a heated vapor in the tube 51; and the aerated vapor is eventually carried into the combustion chambers of the engine and commingled with the fuel mixture from the carburetor in the intake manifold.

It will also be appreciated by those skilled in the art that there is no likelihood of the wick being drawn downwardly into the jar 17 when the engine is shut off by virtue of the arrangement provided including the springs which lock the wick in place. The arrangement insures the proper permanent positioning of the wick in place, and the screen guard arrangement and apertures will function to prevent the entrance of any solid matter into the tube. The result is that the liquid contents of the jar will be satisfactorily atomized and sprayed into the fuel mixture entering the combustion chamber of the engine.

By the use of the apparatus of the present invention in the operation of the engine the explosive fuel mixture is not only humidified to such an extent that accumulation of carbon deposit within the combustion chambers and engine cylinders is greatly minimized and a greater economical effect in fuel consumption and great power and high efficiency are attained in the operation of the engine, but also the accomplishment of these results is insured.

It is desired to emphasize that the features shown are merely concrete exemplifications of the principle of my invention, and that these features, such as the means for locking the wick in place and the screen guard, may be varied considerably. It is to be understood that the particular construction and arrangement shown in the drawing is for the purpose only of illustrating a practical adaptation of the invention, and the structure may be modified without departing from the spirit and scope of my invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. An atomizing device of the character described comprising a liquid supply receptacle, a supply pipe for conveying the atomized vapor to the intake manifold of an internal combustion engine, a main wick tube extending within said receptacle, a closure member for said receptacle, a nipple connection between said supply pipe and said wick tube, a nozzle member in said nipple connection, a wick extending through said main wick tube, and a mesh guard for the lower extremity of said wick tube.

2. An atomizing device of the character described comprising a liquid supply receptacle, a supply pipe for conveying the atomized vapor to the intake manifold of an internal combustion engine, a main wick tube extending within said receptacle, a closure member for said receptacle, a nipple connection between said supply pipe and said wick tube, a nozzle member in said nipple connection, a mesh guard for the lower extremity of said wick tube, a wick extending through said wick tube, and spring means for clamping the lower extremity of said wick in said wick tube.

3. An atomizing device of the character described, comprising a liquid supply receptacle, a supply pipe for conveying the atomized vapor to the intake manifold of an internal combustion engine, a main wick tube extending within said receptacle, a closure member for said receptacle, a nipple connection between said supply pipe and said wick tube, a nozzle member in said nipple connection, a mesh guard for the lower extremity of said wick tube, a wick extending through said wick tube, spring means for clamping the lower extremity of said wick in said wick tube, and a valve mounted between said wick tube and said supply pipe.

4. An atomizing device of the character described, comprising a liquid supply receptacle and a closure therefor, a supply pipe for conveying the atomized vapor to the intake manifold of an internal combustion engine, a wick tube connected to said supply pipe, a mesh guard for said wick tube, a wick in said wick tube, and means to secure said wick in spaced relation to the interior of said tube.

5. An atomizing device of the character described, comprising a liquid supply receptacle and a closure therefor, a supply pipe for conveying the atomized vapor to the intake manifold of an internal combustion engine, a wick tube connected to said supply pipe, a mesh guard for said wick tube, a wick in said wick tube, and means to secure said wick in spaced relation to the interior of said tube, said means comprising a spring engaging the inner side of said tube.

6. An atomizing device of the character described, comprising a liquid supply receptacle and a closure therefor, a supply pipe for conveying the atomized vapor to the intake manifold of an internal combustion engine, a wick tube connected to said supply pipe, a mesh guard for said wick tube, a wick in said wick tube, and means to secure said wick in spaced relation to the interior of said tube, said means comprising a spring engaging the inner side of said tube, said spring having a loop adapted to engage said wick.

7. An atomizing device of the character described, comprising a liquid supply receptacle and a closure therefor, a supply pipe extending through said closure for conveying the atomized vapor to the intake manifold of an internal combustion engine, a main wick tube in said receptacle, a wick positioning tube in said main wick tube, a wick in said tubes, and securing means adapted to engage said positioning tube and said wick.

8. An atomizing device of the character described, comprising a liquid supply receptacle and a closure therefor, a supply pipe extending through said closure for conveying the atomized vapor to the intake manifold of an internal combustion engine, a main wick tube in said receptacle, a wick positioning tube in said main wick tube, a wick in said tubes having its end portions extending out from said positioning tube, and means to secure said ends to said positioning tube.

9. An atomizing device of the character described, comprising a liquid supply receptacle and a closure therefor, a supply pipe extending through said closure for conveying the atomized vapor to the intake manifold of an internal combustion engine, a main wick tube in said receptacle, a wick positioning tube in said main wick tube, a wick in said tubes having its end portions extending out from said positioning tube, and means to secure said ends to said positioning tube, said means comprising a clamping spring.

DANIEL L. COVYEOW.